US009767187B2

(12) United States Patent
Hoyne et al.

(10) Patent No.: US 9,767,187 B2
(45) Date of Patent: Sep. 19, 2017

(54) CONTENT RECOMMENDATIONS BASED ON ORGANIC KEYWORD ANALYSIS

(71) Applicant: Google Inc., Mountain View, CA (US)

(72) Inventors: Neil Hoyne, Santa Clara, CA (US); Johannes Arensman, San Carlos, CA (US)

(73) Assignee: Google Inc., Mountain View, CA (US)

( * ) Notice: Subject to any disclaimer, the term of this patent is extended or adjusted under 35 U.S.C. 154(b) by 607 days.

(21) Appl. No.: 14/085,499

(22) Filed: Nov. 20, 2013

(65) Prior Publication Data

US 2015/0363488 A1    Dec. 17, 2015

(51) Int. Cl.
*G06F 7/00* (2006.01)
*G06F 17/30* (2006.01)

(52) U.S. Cl.
CPC .... *G06F 17/30684* (2013.01); *G06F 17/3089* (2013.01)

(58) Field of Classification Search
None
See application file for complete search history.

(56) References Cited

U.S. PATENT DOCUMENTS

| | | | | |
|---|---|---|---|---|
| 8,099,491 B2* | 1/2012 | Error | ............ | H04W 4/02 706/21 |
| 8,131,703 B2* | 3/2012 | Bessieres | .......... | G06F 17/30864 707/706 |
| 2011/0219295 A1* | 9/2011 | Adams | ................ | G06F 17/00 715/234 |
| 2011/0302025 A1 | 12/2011 | Hsiao et al. | | |
| 2011/0307322 A1 | 12/2011 | Hsiao et al. | | |
| 2011/0307324 A1 | 12/2011 | Hsiao et al. | | |
| 2011/0307325 A1 | 12/2011 | Hsiao et al. | | |
| 2011/0307326 A1 | 12/2011 | Hsiao et al. | | |
| 2011/0307330 A1 | 12/2011 | Hsiao et al. | | |
| 2011/0307509 A1 | 12/2011 | Hsiao et al. | | |
| 2011/0307515 A1 | 12/2011 | Chen et al. | | |
| 2012/0041918 A1 | 2/2012 | Yu et al. | | |
| 2012/0078709 A1* | 3/2012 | Dunham | ............ | G06Q 30/0242 705/14.42 |

(Continued)

OTHER PUBLICATIONS

Non-Final Office Acton, U.S. Appl. No. 14/085,477, mailed on Oct. 6, 2016.

*Primary Examiner* — Hasanul Mobin
(74) *Attorney, Agent, or Firm* — Foley and Lardner LLP; John D. Lanza

(57) ABSTRACT

Systems, methods, and computer-readable storage media that may be used to generate recommendations based on organic search term analysis are provided. One method includes determining conversion path data for a content provider. The method further includes determining a plurality of organic search keywords within the conversion path data. The method further includes analyzing the plurality of organic search keywords within the conversion path data to generate an analysis metric for each of the plurality of organic search keywords. The method further includes selecting one or more of the plurality of organic search keywords based on the analysis metrics for the organic search keywords, and generating one or more recommendations for new content to be published by the content provider based on the selected one or more organic search keywords.

24 Claims, 7 Drawing Sheets

(56) References Cited

U.S. PATENT DOCUMENTS

| | | | |
|---|---|---|---|
| 2012/0226713 A1 | 9/2012 | Park et al. | |
| 2012/0259854 A1* | 10/2012 | Hsiao | G06Q 30/0251 707/739 |
| 2013/0046747 A1 | 2/2013 | Gouyet et al. | |
| 2013/0055137 A1* | 2/2013 | Choc | G06Q 30/02 715/772 |
| 2013/0091142 A1* | 4/2013 | Joseph | G06Q 30/0277 707/748 |
| 2013/0138503 A1* | 5/2013 | Brown | G06Q 30/0246 705/14.45 |
| 2013/0173573 A1* | 7/2013 | Song | G06F 17/30864 707/706 |

* cited by examiner

Acme Shoe Co.

You may want to consider adding some of the following keywords to your portfolio:

Upper-Funnel Keywords that may help increase awareness of your brand:

| Keyword | Position in Conversion Path (1 earliest, 10 closest to conversion) | Relative Cost (1 lowest, 10 highest) | | |
|---|---|---|---|---|
| Marathon Training | 2 | 2 | Accept | Reject |
| Industrial Safety | 1 | 1 | Accept | Reject |
| Distance Running | 1 | 3 | Accept | Reject |

Lower-Funnel Keywords that may more directly drive conversions:

| Durable Long-Distance Shoe | 9 | 6 | Accept | Reject |
| Comfortable Steel Toe Boot | 8 | 7 | Accept | Reject |

Acme Shoe Co.

The following search keywords were frequently used early in your conversion paths. Developing content (e.g., webpages, mobile apps, etc.) directed to these topics may help raise awareness of your brand and drive additional conversions:

| Keyword | Position in Conversion Path (1 earliest, 10 closest to conversion) |
| --- | --- |
| Marathon Training | 6 |
| Industrial Safety | 4 |
| Local Running Routes | 5 |
| Shoe Maintenance | 6 |

FIG. 5

CONTENT RECOMMENDATIONS BASED ON ORGANIC KEYWORD ANALYSIS

BACKGROUND

Content providers often publish content items in networked resources through online content management systems with the goal of having an end user interact with (e.g., click through) the content items and purchase a product or service offered by the content providers. Content providers traditionally have assigned credit for a conversion largely, if not entirely, to the last click prior to the conversion. Attribution is based on the principle that conversion decisions are the cumulative result of many interactions (e.g., clicks, impressions, video views, etc.) over time, and not just the last click prior to a conversion. Evaluating keywords based solely on the last click prior to conversion ignores the contributions made by keywords earlier in the conversion paths.

SUMMARY

One illustrative implementation of the disclosure relates to a method that includes determining, at a computerized analysis system, conversion path data for a content provider. The conversion path data includes data relating to a plurality of conversion paths associated with the content provider leading to a plurality of conversions. Each of the plurality of conversion paths includes one or more user actions leading to one of the plurality of conversions. The method further includes determining, at the analysis system, a plurality of organic search keywords within the conversion path data. The plurality of organic search keywords are keywords that are not included within a set of paid keywords associated with bids submitted by the content provider. The method further includes analyzing, at the analysis system, the plurality of organic search keywords within the conversion path data to generate an analysis metric for each of the plurality of organic search keywords. The method further includes generating one or more recommendations for organic search keywords to add to the set of paid keywords based on the analysis metrics for the plurality of search keywords.

Another implementation relates to a system that includes at least one computing device operably coupled to at least one memory and configured to determine conversion path data for a content provider. The conversion path data includes data relating to a plurality of conversion paths associated with the content provider leading to a plurality of conversions. Each of the plurality of conversion paths includes one or more user actions leading to one of the plurality of conversions. The at least one computing device is further configured to determine a plurality of organic search keywords within the conversion path data. The plurality of organic search keywords are keywords that are not included within a set of paid keywords associated with bids submitted by the content provider. The at least one computing device is further configured to analyze the plurality of organic search keywords within the conversion path data to generate an analysis metric for each of the plurality of organic search keywords. The at least one computing device is further configured to generate one or more recommendations for organic search keywords to add to the set of paid keywords based on the analysis metrics for the plurality of search keywords.

Yet another implementation relates to one or more computer-readable storage media having instructions stored thereon that, when executed by at least one processor, cause the at least one processor to perform operations. The operations include determining conversion path data for a content provider. The conversion path data includes data relating to a plurality of conversion paths associated with the content provider leading to a plurality of conversions. Each of the plurality of conversion paths includes one or more user actions leading to one of the plurality of conversions. The operations further include determining a plurality of organic search keywords within the conversion path data. The plurality of organic search keywords are keywords that are not included within a set of paid keywords associated with bids submitted by the content provider. The operations further include analyzing the plurality of organic search keywords within the conversion path data to generate an analysis metric for each of the plurality of organic search keywords. The analysis metric includes a conversion contribution metric related to how directly the organic search keyword contributes to the plurality of conversions. The operations further include generating one or more recommendations for organic search keywords to add to the set of paid keywords based on the analysis metrics for the plurality of search keywords. The operations further include providing the one or more recommendations to the content provider within an interface through which the content provider can select one or more of the recommendations for implementation within the set of paid keywords.

Another illustrative implementation of the disclosure relates to a method that includes determining, at a computerized analysis system, conversion path data for a content provider. The conversion path data includes data relating to a plurality of conversion paths associated with the content provider leading to a plurality of conversions, and each of the plurality of conversion paths includes one or more user actions leading to one of the plurality of conversions. The method further includes determining, at the analysis system, a plurality of organic search keywords within the conversion path data. The plurality of organic search keywords are keywords that are not included within a set of paid keywords associated with bids submitted by the content provider. The method further includes analyzing, at the analysis system, the plurality of organic search keywords within the conversion path data to generate an analysis metric for each of the plurality of organic search keywords. The method further includes selecting one or more of the plurality of organic search keywords based on the analysis metrics for the organic search keywords, and generating one or more recommendations for new content to be published by the content provider based on the selected one or more organic search keywords.

Another implementation relates to a system including at least one computing device operably coupled to at least one memory. The at least one computing device is configured to determine conversion path data for a content provider. The conversion path data includes data relating to a plurality of conversion paths associated with the content provider leading to a plurality of conversions. Each of the plurality of conversion paths includes one or more user actions leading to one of the plurality of conversions. The at least one computing device is further configured to determine a plurality of organic search keywords within the conversion path data. The plurality of organic search keywords are keywords that are not included within a set of paid keywords associated with bids submitted by the content provider. The at least one computing device is further configured to analyze the plurality of organic search keywords within the conversion path data to generate an analysis metric for each of the plurality of organic search keywords. The at least one computing device is further configured to select one or more of the plurality of organic search keywords based on the analysis metrics for the organic search keywords, and to generate one or more recommendations for new content to be published by the content provider based on the selected one or more organic search keywords.

Yet another implementation relates to one or more computer-readable storage media having instructions stored thereon that, when executed by at least one processor, cause the at least one processor to perform operations. The operations include determining conversion path data for a content provider. The conversion path data includes data relating to a plurality of conversion paths associated with the content provider leading to a plurality of conversions. Each of the plurality of conversion paths includes one or more user actions leading to one of the plurality of conversions. The operations further include determining a plurality of organic search keywords within the conversion path data. The plurality of organic search keywords are keywords that are not included within a set of paid keywords associated with bids submitted by the content provider. The operations further include analyzing the plurality of organic search keywords within the conversion path data to generate an analysis metric for each of the plurality of organic search keywords. The analysis metric includes a conversion contribution metric related to how directly the organic search keyword contributes to the plurality of conversions. The operations further include selecting one or more of the plurality of organic search keywords based on the analysis metrics for the organic search keywords. The operations further include generating one or more recommendations for new content to be published by the content provider based on the selected one or more organic search keywords, and providing the one or more recommendations to the content provider.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 3B is an illustration of a user interface configured to provide the paid keyword recommendations generated using the process of FIG. 2 to a content provider according to an illustrative implementation.

FIG. 5 is an illustration of a user interface configured to provide the content recommendations generated using the process of FIG. 4 to a content provider according to an illustrative implementation.

DETAILED DESCRIPTION

Figure 1:
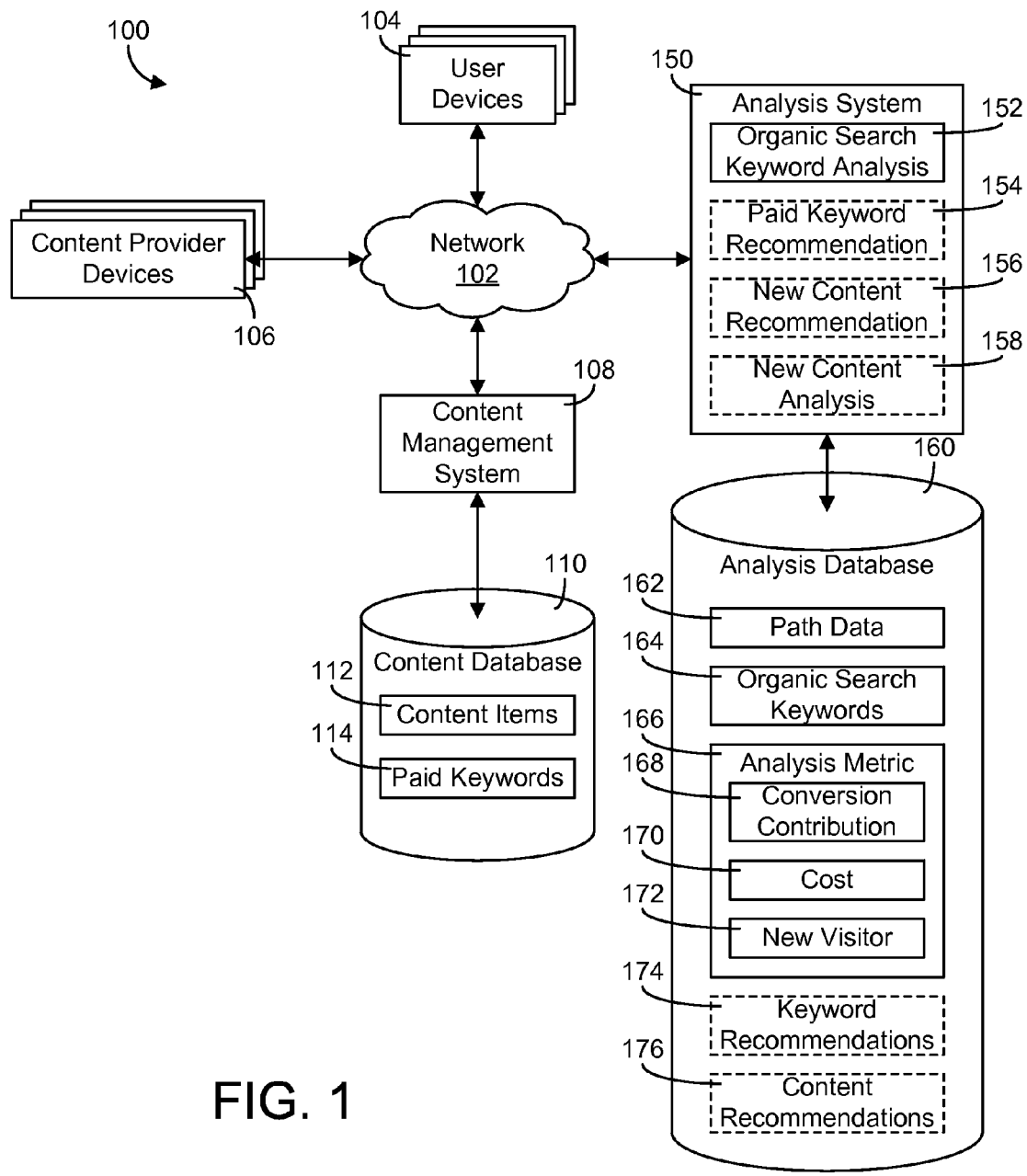
FIG. 1 is a block diagram of an analysis system and associated environment according to an illustrative implementation.

Referring generally to the Figures, various illustrative systems and methods are provided that may be used to generate recommendations to content providers based on analysis of organic search keywords in conversion path data. Many content providers look primarily at a single user activity to determine whether a displayed content item is successful (e.g., whether the user converted or did not convert), without considering the entire path of user activity that leads to conversions. On this basis, content providers may focus heavily on last-click keywords, or keywords associated with the final user activity or selection prior to a conversion, when deciding paid keywords on which to bid in an auction system for displaying content items. This focus does not account for the contributions that user activity earlier in the conversion paths make towards ultimately driving the conversions.

In order to evaluate keywords in a manner that does not purely examine the last click, a content provider may look at a limited amount (e.g., 18 months) of historical conversion path data to understand how paid keywords have performed across the marketing funnel. However, the resulting models are limited by the fact that the only keywords invested in historically were those that performed favorably in the traditional last-click measurement system. Any truly upper-funnel keywords, or keywords that appear early in the conversion paths, would have been turned off early and not been invested in due to perception of poor performance, and would not be identified in such a resulting model.

This disclosure provides systems and methods for examining organic search keywords in a content provider's conversion paths and generating new keyword recommendations based on the analysis. An illustrative system may receive or generate a set of organic search keyword data using conversion path data associated with a content provider. In some implementations, the organic search keyword data may be generated by removing paid keywords from a set of conversion path data including both paid and organic path data, leaving only the organic search keywords in a resulting organic conversion path data set.

The resulting organic search keyword data may be analyzed to generate one or more new keyword recommendations. In some implementations, some or all of the organic search keywords included in the organic search keyword data may be evaluated for their contribution to conversions. For example, in some implementations, an assist-to-last ratio may be calculated for each organic keyword, as described in further detail below. The assist-to-last ratio and/or another conversion contribution measure may be used to determine a relative position in the conversion funnel for each organic keyword. Upper-funnel keywords may represent higher opportunity as well as higher risk; such keywords may be associated with longer conversion times and more compounding interactions to reach a conversion, but also are more likely to be ignored by other competitors in an auction and be less expensive to the content provider than lower-funnel keywords. Lower-funnel keywords, or keywords that appear close to conversions in the conversion paths, may have shorter conversion times and be more directly correlated to conversions, but may be heavily focused upon by other competitors and more expensive.

In some implementations, factors other than conversion contribution may be considered when generating and/or presenting recommendations. For example, a cost metric (e.g., an anticipated cost per click, or CPC) may be generated for one or more of the analyzed organic keywords indicating an estimated cost to the content provider if the content provider added the organic keyword as a paid keyword. In some implementations, a normalized value may be used against other paid keyword portfolio terms to highlight terms with greatest potential (e.g., a relative cost indication rather than an absolute cost to the content provider). In some implementations, a new visitor metric may be generated to place greater importance or weight on those organic keywords that tend to drive new traffic to the content provider versus driving returning customers to convert.

The system may generate a report providing one or more new keyword recommendations based on the analyzed organic keywords. In some implementations, the analyzed organic keyword opportunities may be compared against the content provider's current portfolio of paid keywords to separate new opportunities and/or to provide a comparative evaluation for the content provider against those terms for which the content provider has previously submitted paid bids. The recommendations may be provided through an interface which allows the content provider to accept and/or reject the recommendations. In some implementations, the accepted recommendations may automatically be processed and added to the content provider's portfolio of paid keywords. In some implementations, the reactions (e.g., acceptances or rejections) of the content provider to the recommendations may be used in determining subsequent keyword recommendations.

In some implementations, the analyzed organic keywords may additionally or alternatively be used to generate recommendations for content the content provider may wish to consider providing to users, such as new webpages, mobile applications, etc. that may be of interest to users based on the organic search keyword analysis. For example, the organic search keyword analysis may indicate that a frequent upper-funnel phrase in the conversion paths for a fictional Acme Shoe Company is "marathon training." In such an implementation, a recommendation may be provided to the content provider to publish a section on its website dedicated to informational resources on training for a marathon. Such resources may generate upper-funnel traffic to Acme Shoe Company's website and place Acme in the forefront of the consumer's mind early in the decision-making process, which may help generate more conversions.

In some implementations, organic search keyword analysis may be used to evaluate traffic navigating to existing content, or to the new content after it is generated. For example, the organic search keyword analysis may be used to assess the contribution of the traffic to the content towards eventually converting (e.g., using assist-to-last ratios) and make recommendations for building similar content and/or for using paid search to scale the volume of traffic sent to the content.

In some implementations, organic search keyword data may be generated and collected by systems operated by an operator of the analysis system, and/or recommendations may be made to modify paid keywords used in bidding on content items to be published by a content management system operated by the operator of the analysis system. In some implementations, some or all of the organic search keyword data may be received from third parties, such as content distribution networks for which keywords associated with published content with which users interact is at least partially available to the operator of the analysis system. In some implementations, recommendations may be made that may be used to modify a set of paid keywords used in making bids to publish content using a third-party content management system.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Referring now to FIG. 1, and in brief overview, a block diagram of an analysis system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content from which content management system 108 selects items may be provided by one or more content providers via network 102 using one or more content provider devices 106.

In some implementations, bids for content to be selected by content management system 108 may be provided to content management system 108 from content providers participating in an auction using devices, such as content provider devices 106, configured to communicate with content management system 108 through network 102. In such implementations, content management system 108 may determine content to be published in one or more content interfaces of resources (e.g., webpages, applications, etc.) shown on user devices 104 based at least in part on the bids.

In some implementations, an analysis system 150 may be configured to analyze organic search keyword data relating to conversion paths for a content provider and develop recommendations for new paid keywords the content provider may wish to bid on in auctions and/or new content the content provider may wish to consider publishing. Organic search keywords are keywords that are not a part of the set of paid keywords 114 associated with auction bids submitted by the content provider. Organic search keywords may be keywords included in search queries leading to a user interaction (e.g., click/selection, being presented with an impression, etc.) with a content item that is not shown as the result of a paid bid by the content provider and/or other content providers. The conversion path data may include multiple conversion paths, and each conversion path may include one or more user actions that ultimately lead to a conversion (e.g., a sale of a product and/or service). The conversion path data may include user actions associated with organic search keywords as well as user actions associated with paid keywords.

Analysis system 150 may be configured to analyze the organic search keyword data to generate one or more analysis metrics. For example, analysis system 150 may generate a metric for each organic search keyword representing whether the organic search keyword appeared most frequently near the top of the marketing funnel (e.g., in connection with early user interactions, further away from the end conversions) or near the bottom of the funnel (e.g., in connection with later user interactions, near the end conversions). Analysis system 150 may be configured to utilize the metric to generate one or more recommendations. In some implementations, analysis system 150 may suggest adding one or more of the organic search keywords to the content provider's paid keyword portfolio. For example, adding upper-funnel organic search keywords may help increase awareness of the content provider's brands. In some implementations, analysis system 150 may suggest new types of content the content provider might consider creating and publishing based on the organic search keywords. For example, if a particular organic search keyword appears frequently near the top of the marketing funnel in the content provider's conversion path data, developing content directed to the subject matter of that organic search keyword may help raise awareness of the content provider's brands early in users' search processes, and may ultimately help drive a larger number of conversions for the content provider.

Referring still to FIG. 1, and in greater detail, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or content provider devices 106 may be configured to receive data from various sources using a network 102. In some implementations, network 102 may comprise a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among third-party content providers to determine which third-party content is to be provided to a user device 104. For example, content management system 108 may conduct a real-time content auction in response to a user device 104 requesting first-party content from a content source (e.g., a website, search engine provider, etc.) or executing a first-party application. Content management system 108 may use any number of factors to determine the winner of the auction. For example, the winner of a content auction may be based in part on the third-party content provider's bid and/or a quality score for the third-party provider's content (e.g., a measure of how likely the user of the user device 104 is to click on the content). In other words, the highest bidder is not necessarily the winner of a content auction conducted by content management system 108, in some implementations.

Content management system 108 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at user devices 104. In some implementations, the bid amount may be on a cost per impression or cost per thousand impressions (CPM) basis. In further implementations, a bid amount may correspond to a specified action being performed in response to the third-party content being presented at a user device 104. For example, a bid amount may be a monetary amount that the third-party content provider is willing to pay, should their content be clicked on at the client device, thereby redirecting the client device to the provider's webpage or another resource associated with the content provider. In other words, a bid amount may be a cost per click (CPC) bid amount. In another example, the bid amount may correspond to an action being performed on the third-party provider's website, such as the user of the user device 104 making a purchase. Such bids are typically referred to as being on a cost per acquisition (CPA) or cost per conversion basis.

A campaign created via content management system 108 may also include selection parameters that control when a bid is placed on behalf of a third-party content provider in a content auction. If the third-party content is to be presented in conjunction with search results from a search engine, for example, the selection parameters may include one or more sets of search keywords. For instance, the third-party content provider may only participate in content auctions in which a search query for "golf resorts in California" is sent to a search engine. Other example parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of an particular online newspaper.

Content management system 108 may also be configured to suggest a bid amount to a third-party content provider when a campaign is created or modified. In some implementations, the suggested bid amount may be based on aggregate bid amounts from the third-party content provider's peers (e.g., other third-party content providers that use the same or similar selection parameters as part of their campaigns). For example, a third-party content provider that wishes to place an advertisement on the sports page of an online newspaper may be shown an average bid amount used by other advertisers on the same page. The suggested bid amount may facilitate the creation of bid amounts across different types of client devices, in some cases. In some implementations, the suggested bid amount may be sent to a third-party content provider as a suggested bid adjustment value. Such an adjustment value may be a suggested modification to an existing bid amount for one type of device, to enter a bid amount for another type of device as part of the same campaign. For example, content management system 108 may suggest that a third-party content provider increase or decrease their bid amount for desktop devices by a certain percentage, to create a bid amount for mobile devices.

Analysis system 150 may interact with user devices 104, content provider devices 106, content management system 108, and/or various other devices and/or systems to collect data for use in performing analysis of organic search keywords in conversion path data and generating and providing recommendations to content providers. Analysis system 150 may store and/or retrieve data for use in performing various analyses in an analysis database 160. As described in further detail with respect to FIGS. 2-5, according to illustrative implementations, analysis system 150 may identify one or more organic search keywords 164 within conversion path data 162 for a content provider. Analysis system 150 may include an organic search keyword analysis module 152 configured to analyze organic search keywords 164 and generate one or more analysis metrics 166 for each organic search keyword 164. For example, analysis metrics 166 may include a conversion contribution metric 168 related to how directly the organic search keyword contributes to conversions (e.g., whether the keyword generally appears in connections with upper-funnel or lower-funnel events), a cost metric 170 indicating a relative cost to the content provider if the organic search keyword were added to the content provider's paid keywords 114, a new visitor metric 172 related to how often within the conversion path data the organic search keyword is associated with driving new customers to a resource (e.g., website) of the content provider, and/or other types of metrics. In some implementations, analysis system 150 and content management system 108 may be integrated within a single system (e.g., content management system 108 may be configured to incorporate some or all of the functions/capabilities of analysis system 150).

In some implementations, analysis system 150 may include a paid keyword recommendation module 154. Paid keyword recommendation module 154 may be configured to generate recommendations to add one or more of organic search keywords 164 to the content provider's paid keywords 114 based on analysis metrics 166 generated by organic search keyword analysis module 152. In some implementations, analysis system 150 may additionally or alternatively include a new content recommendation module 156 configured to generate recommendations for types of new content the content publisher may wish to consider generating and/or publishing (e.g., on the publisher's website) based on selected organic search keywords 164 determined based on analysis metrics 166. Modules of analysis system 150, such as modules 152, 154, and/or 156, may be implemented as instructions stored within a computer-readable storage medium operably coupled to analysis system 150 and executable by at least one processor of analysis system 150.

Figure 2:
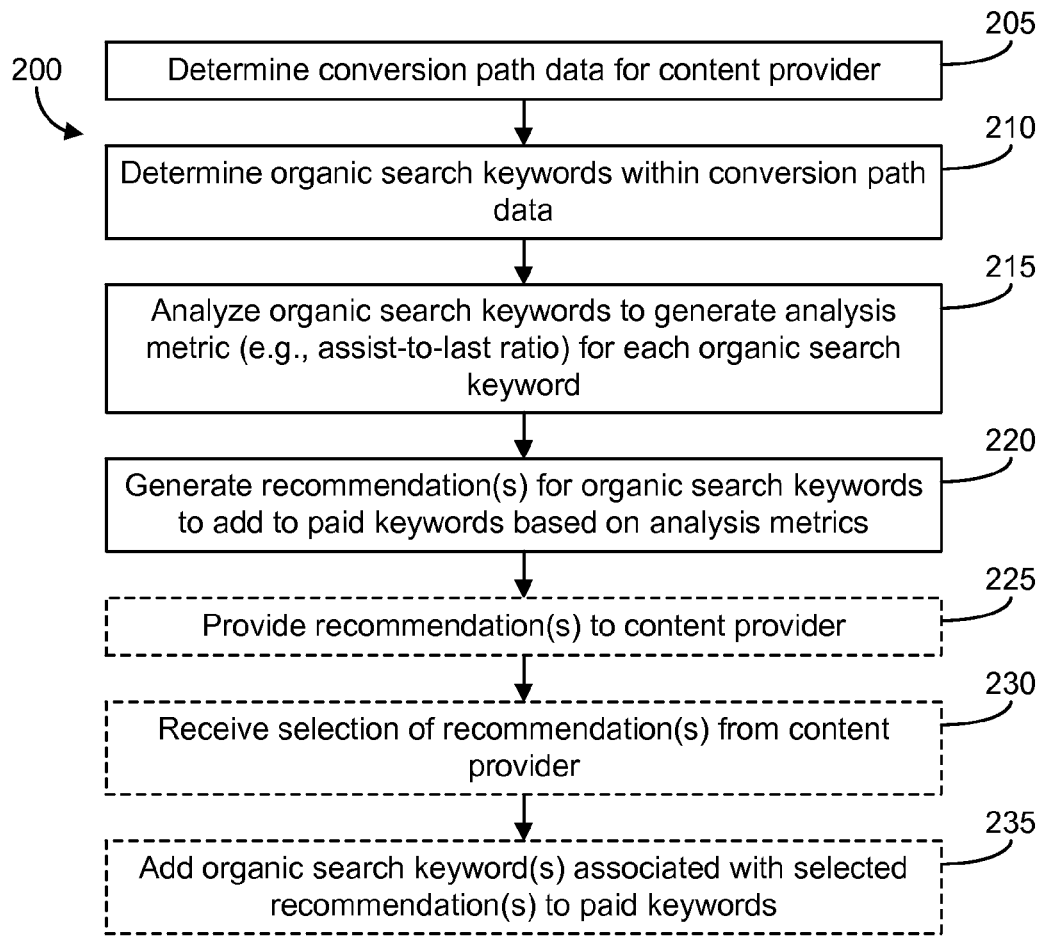
FIG. 2 is a flow diagram of a process for generating recommendations for paid keywords based on analysis of organic search keywords in conversion path data according to an illustrative implementation.

FIG. 2 illustrates a flow diagram of a process 200 for generating recommendations for paid keywords based on analysis of organic search keywords in conversion path data according to an illustrative implementation. Referring to both FIGS. 1 and 2, analysis system 150 may be configured to determine conversion path data 162 for a content provider (205). Conversion path data 162 includes data relating to multiple conversion paths associated with the content provider leading to multiple conversions. A conversion may include a sale of a product or service, receipt of one or more information items from a user, receipt of a communication (e.g., a phone call) from a user, and/or any other type of user activity that the content provider desires for users to perform and/or that represents some value to the content provider. In some implementations, each conversion path may begin with one or more user interactions and end with a converting activity. The interactions may be instances where impressions of a content item have been displayed on the user device of the user, instances where the user clicked through or otherwise selected the content item, instances where the user converted, etc. In various implementations, conversion path data 162 may be generated by analysis system 150 and/or received from one or more external systems.

Conversion path data 162 may include paid interactions, or interactions associated with content items that were selected by content management system 108 (e.g., through an auction process) in response to bids submitted by the content provider in association with paid keywords 114. Conversion path 162 may also include organic interactions, or interactions associated with content items, such as search results, that were not provided to the user as a result of paid bids and associated paid keywords 114. For example, when a user submits a search query through a search interface, the user may be provided with a set of paid content items (e.g., text items, images, etc.) and a set of organic content items, such as links to resources (e.g., websites) deemed relevant to the search query by the search engine. In this example, when conversion path data 162 reflects user selection of an organic content item, some or all of the keywords of the search query leading to selection of the content item may be considered organic search keywords (e.g., if the keywords are not a part of paid keywords 114). In some implementations, some or all interaction instances within conversion path data 162 may include one or more keywords associated with the interaction.

Figure 3A:
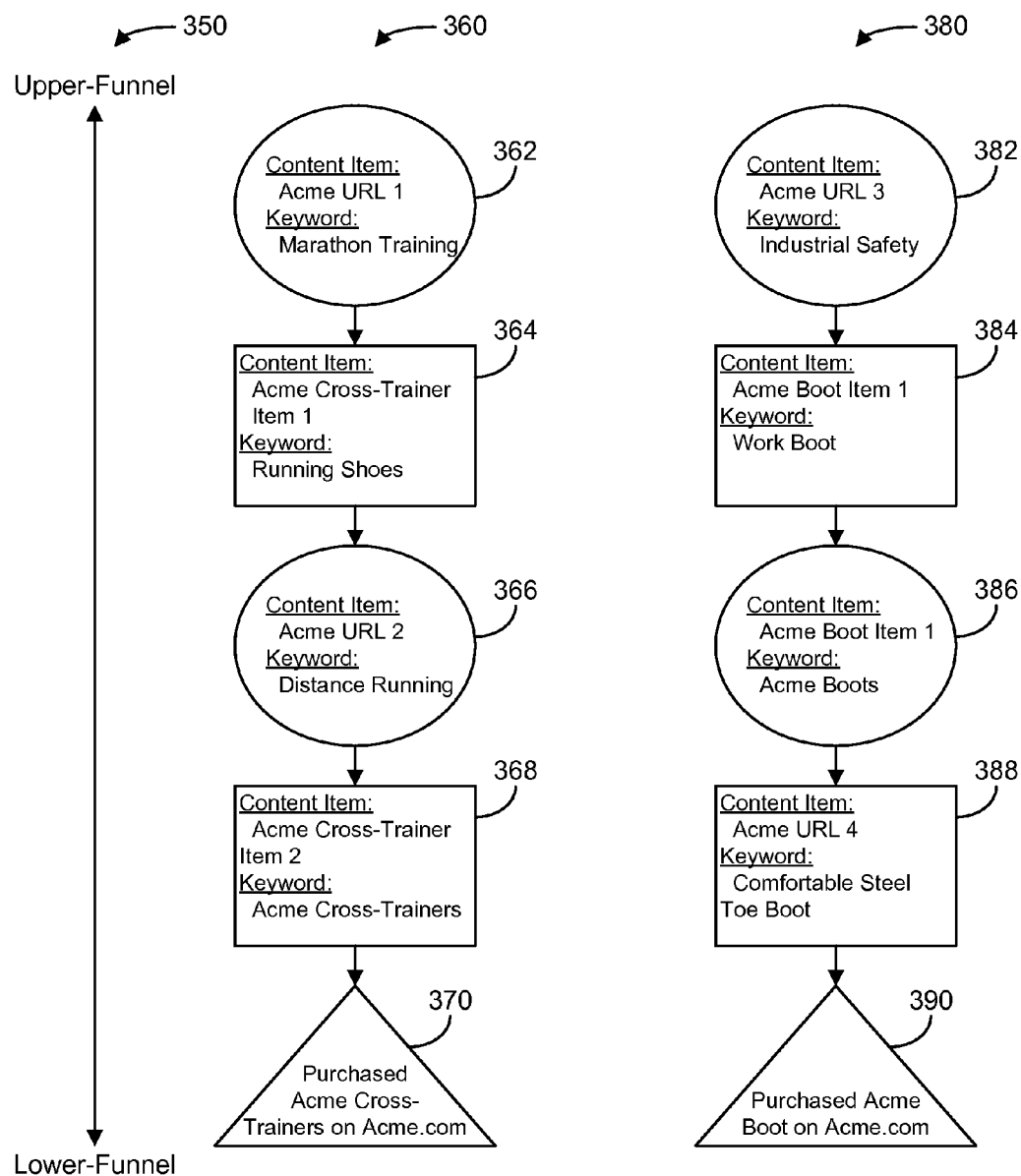
FIG. 3A is a visual representation of conversion path data according to an illustrative implementation.
Figure 4:
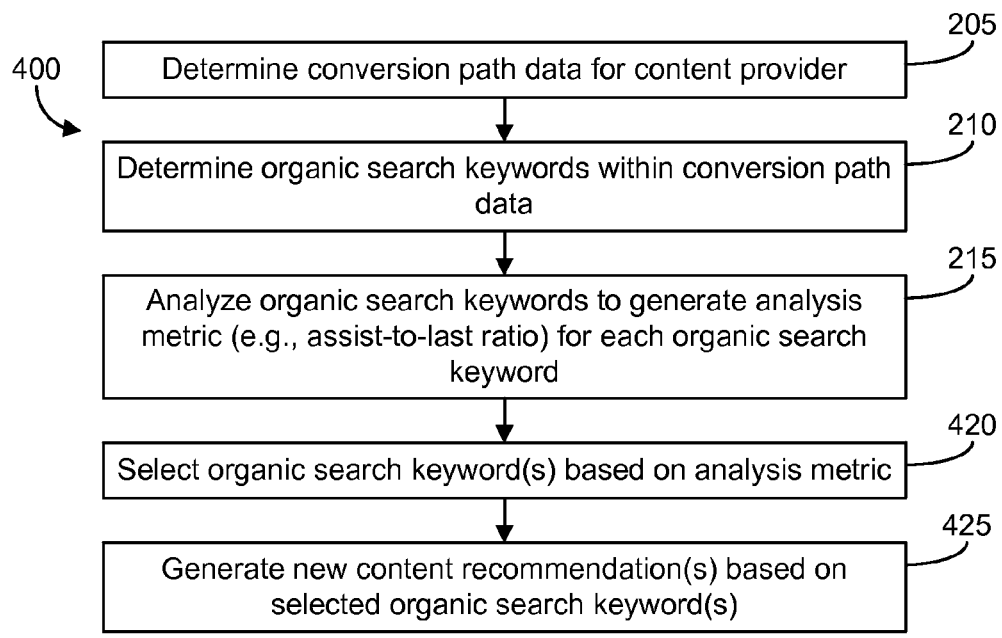
FIG. 4 is a flow diagram of a process for generating recommendations for types of new content a content publisher may want to consider publishing based on analysis of organic search keywords in conversion path data according to an illustrative implementation.

FIG. 3A provides a visual representation of a basic set of conversion path data 350 according to an illustrative implementation. Conversion path data 350 is associated with a fictional Acme Shoe Company. Conversion path data 350 includes a first conversion path 360 leading to a first conversion 370, and a second conversion path 380 leading to a second conversion 390. Each of conversion paths 360 and 380 includes multiple nodes associated with user interactions that ultimately lead to conversions 370 or 390. Nodes near the top of FIG. 3A represent upper-funnel interactions, or interactions that occur near the beginning of the conversion paths, while nodes near the bottom represent lower-funnel interactions, or interactions that occur near the end conversions 370 and 390.

In the illustrated implementation, organic search interactions are illustrated using circular shapes, and non-organic, or paid, interactions are illustrated using rectangular shapes. A very simple conversion path data set has been illustrated here for the purposes of clarity; it should be understood that a typical conversion path data set would include many more than two conversion paths and that the conversion paths may not necessarily be linear in nature. For example, in some conversion path data sets, some nodes may below to multiple conversion paths (i.e., some user interactions may contribute to multiple conversions). Additionally, the conversion path data need not be associated with a single source (e.g., a single search engine); in some implementations, the conversion path data may be aggregated from various different sources.

Conversion path 360 begins with an organic interaction 362. Interaction 362 may represent user selection of a content item, such as a search result, associated with "Acme URL 1" in a search results interface. The search result associated with "Acme URL 1" is displayed in the search results interface in response to the user entering a search query in a search engine interface including the keyword "Marathon Training" The search result is displayed within a set of organic search results in the search results interface and is not displayed as the result of a paid bid submitted by Acme.

The second interaction in conversion path 360 is a non-organic interaction 364. Interaction 364 may represent user selection of a content item (e.g., search result, display image, etc.) "Acme Boot Item 1" that is displayed as the result of a paid bid submitted Acme to display the content item. The content item is displayed in response to user submission of a search query including the keyword "Running Shoes."

Conversion path 360 also includes another organic interaction 366 as well as another non-organic interaction 368. After non-organic interaction 368, a converting activity 370 occurs, as indicated by the triangular shape. In the illustrated implementation, the converting activity is a purchase of an Acme Cross-Trainers shoe product by the user on Acme's website.

Conversion path 380 also begins with an organic interaction 382 in which the user is presented with a content item (e.g., search result) associated with "Acme URL 3" in the search results interface in response to a search query including the keyword "Industrial Safety." Conversion path 380 includes two subsequent non-organic interactions 384 and 386 that are displayed as a result of paid bids submitted by Acme. A final organic interaction 388 resulting from a search query including the keyword "Comfortable Steel Toe Boot" leads to conversion 390, in which the user purchases an Acme Boot product on Acme's website.

Analysis system 150 may store conversion path data such as data 350 visually represented in FIG. 3A in a database or other memory structure. The conversion path data may be stored in a lookup table, linked list, matrix, or any other data structure capable of preserving the interaction data reflected within the conversion paths, including an indicator of the content items selected, the keywords associated with the interactions, and the relationships between interactions (e.g., where in the conversion path the interactions occurred). In some implementations, the data associated with each node in the conversion path may be stored within a single data structure or set of data structures. In some implementations, the data may be stored in separate data structures and/or locations and referenced to one another by an identifier (e.g., a node identifier). For example, in some implementations, all keywords in the conversion path data may be stored in one data structure, and all content identifiers may be stored in a different data structure.

Referring again to FIGS. 1 and 2, analysis system 150 may be configured to determine organic search keywords 164 included within conversion path data 162 (210). In some implementations, analysis system 150 may isolate organic search keywords 164 within conversion path data 162. For example, analysis system 150 may remove paid keywords 114 from a set of all keywords reflected in conversion path data 162 stored in database 160, such that the only keywords left in the set are organic search keywords 164. In some implementations, conversion path data 162 may be configured such that it identifies which keywords and/or interactions are associated with organic activity and which are associated with paid activity.

In the illustrative conversion path data 350 shown in FIG. 3A, analysis system 150 may determine the set of organic search keywords by including only those keywords associated with interactions 362, 366, 382, and 388 in the set of organic search keywords, as these nodes are identified as being associated with organic interactions. If the conversion path data does not differentiate between organic and non-organic interactions, analysis system 150 may determine the organic search keywords by taking a set of all keywords associated with notes in the conversion path data and removing any keywords appearing in paid keywords 114.

Analysis system 150 may perform analysis (e.g., automated analysis) on organic search keywords 164 to generate one or more analysis metrics 166 to be used in generating recommendations (215). In some implementations, analysis system 150 may calculate a conversion contribution metric 168 for each of organic search keywords 164 related to how directly the organic search keyword contributes to the conversions reflected in conversion path data 162. For example, conversion contribution metric 168 may provide an indication of whether the organic keyword tends to appear near the top of the marketing funnel reflected in conversion path data 162 (e.g., in early user interactions, further away from the conversions, such as near the top of the visual representation shown in FIG. 3A), or whether the organic keyword tends to appear near the bottom of the marketing funnel (e.g., in later user interactions, closer to the conversions, such as near the bottom of the visual representation shown in FIG. 3A).

In some implementations, conversion contribution metric 168 may include an assist-to-last ratio. The assist-to-last ratio may be implemented as a measure of the number of conversion paths that include the keyword versus the number of times the keyword appears as the last click before conversion in a path. Thus, in such an implementation, an assist-to-last ratio of one indicates that the keyword is a last-click keyword in every conversion path. An assist-to-last ratio substantially lower than one indicates that the keyword appears in significantly more conversion paths as a last-click keyword than an assisting keyword, and may indicate that the keyword is generally a lower-funnel keyword (generally appears lower, or nearer the end conversions, in the conversion paths). An assist-to-last ratio substantially higher than one indicates that the keyword appears in significantly more conversion paths as an assisting keyword than a last-click keyword, and may indicate that the keyword is generally a higher-funnel keyword (generally appears higher, or further away from the end conversions, in the conversion paths). In some implementations, the assist-to-last ratio may be implemented as a measure of the number of times a keyword appears in the conversion path data as an assisting keyword versus the number of times the keyword appears as the last click before conversion in the path. In some implementations, the assist-to-last ratio may be an assist-click-to-last-click ratio (e.g., a number of assist clicks/selections, or clicks associated with the keyword that were not the last click prior to conversion, versus a number of clicks associated with the keyword that were the last click prior to conversion). In some implementations, the assist-to-last ratio may be a click-assisted-conversions-to-last-click-conversions ratio (e.g., a number of conversion paths on which the keyword was associated with an assist click versus a number of conversion paths on which the keyword was associated with the last click before conversion). In some implementations, the assist-to-last ratio may be an assist-impressions-to-last-click ratio (e.g., a number of assist impressions, or impressions associated with the keyword that were not the last impression shown prior to conversion, versus a number of clicks associated with the keyword that were the last click prior to conversion). In some implementations, the assist-to-last ratio may be an impression-assisted-conversions-to-last-click-conversions ratio (e.g., a number of conversion paths on which the keyword was associated with an assist impression versus a number of conversion paths on which the keyword was associated with the last click before conversion). In various other implementations, other types of conversion contribution metrics (e.g., a first-to-last ratio relating to a number of times the keyword appears as a first click versus the number of times it appears as a last click, an average position metric indicating the average position in which the keyword appears in the conversion paths, etc.) may be calculated and used in generating recommendations.

In some implementations, analysis system 150 may additionally or alternatively generate other analysis metrics 166. For example, analysis system 150 may generate a cost metric 170 indicating a relative cost to the content provider if the content provider adds the organic search keyword to paid keywords 114. Cost metric 170 may be an estimated absolute cost (e.g., an estimated monetary cost to the content provider over a particular time period) or a relative cost (e.g., a cost compared to current paid keywords 114, such as on a scale of one to ten). Analysis system 150 may be configured to generate cost metric 170 based on previous bid data for the organic search keyword (e.g., bids placed by other content providers on the keyword). In some implementations, the data used to generate cost metric 170 may be received from content management system 108.

In some implementations, analysis system 150 may generate a new visitor metric 172. New visitor metric 172 may be related to how often within conversion path data 162 the organic search keyword is associated with driving new customers of the content provider to a resource (e.g., a website) of the content provider and/or to a conversion. Analysis system 150 may be configured to determine whether interactions reflected in conversion path data 162 are associated with new or returning customers based on user device identifiers (e.g., browser application identifiers, such as browser cookies) and/or based on customer data received from the content provider. In some implementations, new visitor metric 172 may be a number of interactions associated with the organic search keyword where the user was a potential new customer, a ratio of interactions associated with a potential new customer versus interactions associated with a previous customer, or another type of metric.

In some implementations, analysis system 150 may generate a scale metric relating to a frequency with which the organic search keyword appeared within conversion path data 162. The scale metric may include a number of times the organic keyword appeared in conversion path data 162, a percentage or ratio associated with the keywords (e.g., versus the total number of organic keywords, total number of paid keywords, total number of combined keywords, etc.), or some other metric representative of and/or related to the prominence of the organic search keyword within conversion path data 162.

In various other implementations, analysis system 150 may generate and utilize various other metrics or secondary factors in generating recommendations. For example, analysis system 150 may generate recommendations based on a device type identifier (e.g., mobile, tablet, desktop, etc.) and/or a location identifier (e.g., country, state, city, region, cellular tower area, etc.). In some implementations, content providers may provide one or more custom metrics for use in generating recommendations, such as an estimated customer lifetime value, a desired profit margin, to achieve a desired impact using newly recommended keywords.

Analysis system 150 may use analysis metrics 166 to generate one or more keyword recommendations 174 for new keywords to be added to the content provider's paid keywords 114 based on the analysis metrics for organic search keywords 164 (220). In some implementations, analysis system 150 may select the organic search keywords upon which keyword recommendations 174 will be based by comparing analysis metrics 166 to one or more thresholds. In some such implementations, any organic search keywords having an analysis metric above an upper threshold or below a lower threshold may be selected as the basis for keyword recommendations 174. In some implementations, a predetermined number of organic search keywords having highest or lowest analysis metrics may be selected as the basis for keyword recommendations 174. In some implementations, the analysis metrics upon which keyword recommendations 174 are based may be a single type of analysis metric (e.g., conversion contribution metric 168) or a combination of multiple types of metrics (e.g., a weighted combination of conversion contribution metric 168, cost metric 170, new visitor metric 172, a scale metric, and/or other metrics). In some implementations, the metrics used to determine keyword recommendations 174 and/or weights applied to the metrics in determining the recommendations may be at least partially customizable by the content provider.

In some implementations, keyword recommendations 174 may be generated by comparing an assist-to-last ratio for each of organic search keywords 164 against one or more threshold assist-to-last ratio levels. For example, an assist-to-last ratio for each organic keyword may be compared to a lower assist-to-last threshold (e.g., lower than 1, such as 0.2). If the assist-to-last ratio for an organic keyword is below the lower threshold, this may indicate that the organic keyword is generally a lower-funnel keyword that tends to be more directly associated with conversions (e.g., generally appears within the last several interactions prior to conversion). In some implementations, such keywords may be included within keyword recommendations 174 as keywords that may be added to help directly drive additional conversions. In some implementations, the assist-to-last ratio for each organic search keyword may be compared to an upper assist-to-last ratio (e.g., above 1, such as 10). If the assist-to-last ratio for an organic keyword is above the upper threshold, this may indicate that the organic keyword is generally an upper-funnel keyword associated with user interactions early in the conversion paths (e.g., generally appears within the first several interactions). In some implementations, such keywords may be included within keyword recommendations 174 as keywords that may be added to help raise brand awareness for the content provider when users are early in their search processes, which may also ultimately help drive later conversions.

In some implementations, keyword recommendations 174 may include recommendations to adopt selected organic search keywords included within conversion path data 162 within paid keywords 114. In some implementations, keyword recommendations 174 may additionally or alternatively include recommendations to adopt new keywords based on organic search keywords within conversion path data 162 that may be different from the organic search keywords themselves. For example, one or more organic search keywords selected based on analysis metrics 166 may be processed (e.g., through an adjacency engine) to determine additional keywords related to the processed organic search keywords. For example, an organic search keyword "shoe" may be processed through an adjacency engine to identify related keywords such as "boot," "sneaker," etc. In some implementations, keyword recommendations 174 may be generated that recommend adoption of such adjacent keywords as part of paid keywords 114.

In some implementations, analysis system 150 may be configured to receive input from the content provider and use the input to generate keyword recommendations 174. For example, a content provider may provide goal information indicating that the content provider wishes to increase awareness of its brand, more directly drive additional conversions, identify possible new paid keywords that may not be the focus of competitors and may be less expensive than other, more popular keywords, etc. Analysis system 150 may be configured to account for the goal in generation keyword recommendations 174. For example, if the goal of the content provider is to increase early awareness of its brand, analysis system 150 may place an emphasis on upper-funnel organic search keywords when generating recommendations 174. In some implementations, analysis system 150 may be configured to allow the content provider to provide input on or directly set one or more thresholds used in generating recommendations, such as an assist-to-last threshold.

Analysis system 150 may be configured to provide the generated keyword recommendations 174 to the content provider (225). Analysis system 150 may transmit keyword recommendations 174 to content provider devices 106 through network 102. In some implementations, the recommendations may be provided within a network-accessible user interface accessed using content provider devices 106, an application resident on content provider devices 106, a report transmitted to the content providers (e.g., to an email account of the content providers accessible by content provider devices 106), etc.

In some implementations, analysis system 150 may be configured to receive a selection of one or more of keyword recommendations 174 by the content provider (230). For example, analysis system 150 may provide an option to the content providers to accept and/or reject one or more of keyword recommendations 174. Analysis system 150 may be configured to add new keywords associated with the selected recommendations to paid keywords 114 (235). In some implementations, analysis system 150 may add the keywords automatically without requiring further intervention from the content provider. In some implementations, analysis system 150 may request that the content provider select one or more options associated with a new keyword bid after receiving the recommendation selection.

In some implementations, analysis system may be configured to use the reaction of the content provider (e.g., the acceptance or rejection) to determine one or more subsequent recommendations to provide to the content provider. For example, if the content provider rejects a suggestion to add the organic search keyword "marathon training" to paid keywords 114, analysis system 150 may be configured to exclude similar organic keywords, such as "marathon running" or "long-distance run training," from being recommended in future recommendations. In another example, if the content provider accepts a suggestion to add "marathon training" to paid keywords 114, analysis system 150 may increase a likelihood of providing recommendations of similar types of organic keywords in similar recommendations. In various implementations, adjustments based on the content provider's reactions may be implemented as exclusion lists, weights applied to emphasize or deemphasize similar organic keywords, and/or in another manner.

FIG. 3B illustrates a user interface 300 in which keyword recommendations 174 may be provided according to an illustrative implementation. Interface 300 illustrates keyword recommendations provided for the fictional Acme Shoe Company. An upper-funnel recommendation section 305 provides recommendations that typically appear near the top of the marketing funnel in conversion path data 162 and may help increase early awareness of Acme's brand. A lower-funnel recommendation section 310 provides recommendations that typically appear near the bottom of the marketing funnel in conversion path data 162 and may help more directly drive additional conversion. In the illustrative implementation shown in FIG. 3B, the content provider is provided with the organic search keywords associated with each recommendation, an indication of conversion contribution 168, and an indication of cost data 170. In the illustrated implementation, the conversion contribution data and cost data are provide on a relative scale of 1 to 10 (e.g., in comparison with other data in conversion path data 162 and/or other keywords, such as in paid keywords 114). In some implementations, raw or absolute data may be provided rather than relative data. In some implementations, different, less, or additional data may be shown in interface 300, such as an indication of how frequently the organic keywords were associated with actions by potential new customers of the content provider, how frequently the organic keywords appeared in conversion path data 162, etc. Interface 300 also includes an accept button 315 and reject button 320 that may be used by the content provider to accept each recommendation for implementation in paid keywords 114 or reject each recommendation and remove it from the list of recommendations.

In some implementations, analysis system 150 may be configured to evaluate the impact of newly added keywords to the performance of paid keywords 114 after the keywords are added to paid keywords 114. For example, an organic keyword may be suggested by analysis system 150, adopted by the content provider, added to paid keywords 114, and lead to few or no appreciable incremental conversions (e.g., a "false positive" opportunity). In such an example, analysis system 150 may be configured to identify the fact that the addition of the organic keyword has not had a substantial positive effect on the performance of paid keywords 114, and may suggest discontinuing use of the organic keyword within paid keywords 114. In some implementations, the effectiveness of a new organic keyword may be validated through controlled experimentation that looks at improved performance, for example, in overall conversion totals, cost per acquisition (CPA) for the content provider, etc. In some implementations, analysis system 150 may evaluate increased assist volume for the new keyword in the converting paths in newly generated conversion path data after the keyword is added to paid keywords 114. Increased, or in this case new, investment in a keyword should generally result in the keyword being present in more converting customer paths. In some implementations, auction position and/or click volume may be used by analysis system 150 as an indicator of whether the investment in the new keyword is driving measurable increases in volume. Using volume of paid and organic search traffic for the new keyword may also help establish if the investment was effective at cannibalizing from free traffic.

In some implementations, analysis system 150 may additionally or alternatively be configured to generate recommendations for new content that a content provider may wish to publish based on analysis of organic search keywords 164. Referring now to both FIGS. 1 and 4, a flow diagram of a process 400 for generating new content recommendations based on analysis of organic search keywords in conversion path data is shown according to an illustrative implementation. Under process 400, analysis system 150 may determine conversion path data 162 (205), determine organic search keywords 164 within conversion path data 162 (210), and analyze organic search keywords 164 to generate one or more analysis metrics 166 (215) in a manner similar to that described above with respect to process 200 for generating keyword recommendations 174.

Analysis system 150 may be configured to select one or more of organic search keywords 164 based on analysis metrics 166 (420). In some implementations, analysis system 150 may be configured to select the organic keywords by comparing the analysis metric for each keyword to a threshold metric. For example, analysis system 150 may compare an assist-to-last ratio for each of organic search keywords 164 to an upper threshold assist-to-last ratio (e.g., to identify organic search keywords frequently utilized early in users' search processes) and/or a lower threshold assist-to-last ratio (e.g., to identify organic search keywords frequently utilized close to when conversions occur). In some implementations, analysis system 150 may additionally or alternatively select organic search keywords by selecting a predetermined number of organic keywords having a highest or lowest analysis metric or by using another method, such as those described above with respect to FIG. 2.

Analysis system 150 may generate one or more new content recommendations 176 based on the selected organic search keywords (425). In some implementations, analysis system 150 may provide the organic keywords themselves to content providers and suggest developing content (e.g., webpages, mobile applications, etc.) related to the subject matter of the organic keywords. In some implementations, analysis system 150 may expand upon the organic keywords to develop a more complete recommendation, either automatically or manually through an operator of analysis system 150 (e.g., a sales representative). Content recommendations 176 may be provided to a content provider through a content recommendation interface presented on content provider devices 106. In some implementations, a content provider may be able to provide a reaction (e.g., approval or rejection) to content recommendations 176 through the interface. The reaction may be used in developing subsequent content recommendations 176.

FIG. 5 illustrates a user interface 500 through which content recommendations 176 may be provided according to an illustrative implementation. Interface 500 includes a list of organic keywords and an indication related to conversion contribution 168, on a scale of 1 to 10, with 1 representing a highest position in the marketing funnel and 10 representing a lowest position. In some implementations, organic keywords may only be included in interface 500 if a scale metric for the organic keywords indicates they appear at least a threshold number or percentage within conversion path data 162. In some implementations, an indication of a scale metric may be provided within interface 500.

In some implementations, analysis system 150 may include a new content analysis module 158 configured to evaluate a contribution of new or existing content published by the content provider and/or make recommendations based on the evaluation. In some implementations, after the content provider adds a new content item (e.g., new webpage), new content analysis module 158 may analyze organic search activity leading to traffic to the new content, as reflected within new conversion path data including activity leading to the new content. New content analysis module 158 may make recommendations for further content the content provider may consider adding based on the analysis of the traffic and/or organic search keywords leading to the new content. New content analysis module 158 may additionally or alternatively suggest one or more new paid keywords that the content provider may wish to add to paid keywords 114 to scale the volume of traffic to the new content. In some implementations, the new content recommendations and/or new paid keyword recommendations may be generated based on an analysis of the organic search keywords leading to the new resource in a manner similar to that described above with respect to processes 200 and/or 400.

Figure 6:
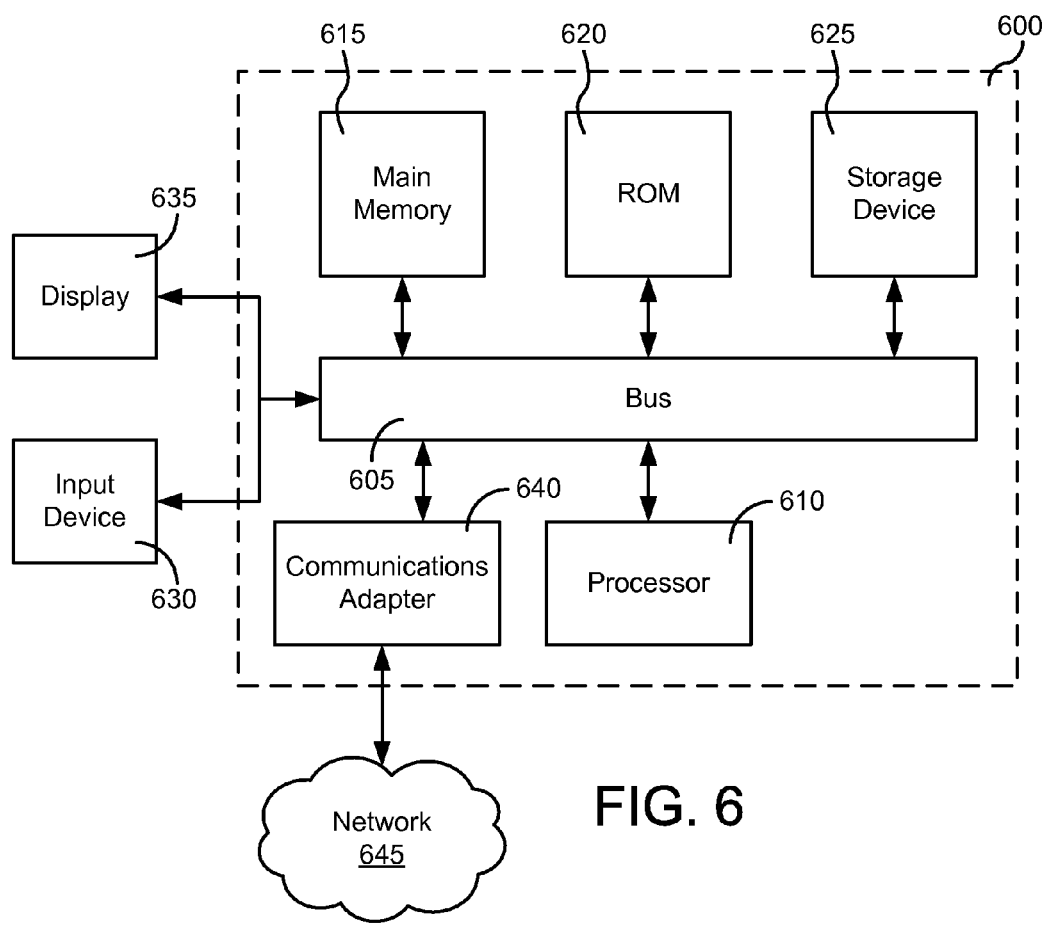
FIG. 6 is a block diagram of a computing system according to an illustrative implementation.

FIG. 6 illustrates a depiction of a computer system 600 that can be used, for example, to implement an illustrative user device 104, an illustrative content management system 108, an illustrative content provider device 106, an illustrative analysis system 150, and/or various other illustrative systems described in the present disclosure. The computing system 600 includes a bus 605 or other communication component for communicating information and a processor 610 coupled to the bus 605 for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

In some implementations, the computing system 600 may include a communications adapter 640, such as a networking adapter. Communications adapter 640 may be coupled to bus 605 and may be configured to enable communications with a computing or communications network 645 and/or other computing systems. In various illustrative implementations, any type of networking configuration may be achieved using communications adapter 640, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

Although an example processing system has been described in FIG. 6, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   determining, at a computerized analysis system, conversion path data for a content provider, wherein the conversion path data comprises data relating to a plurality of conversion paths associated with the content provider leading to a plurality of conversions, and wherein each of the plurality of conversion paths comprises one or more user actions leading to one of the plurality of conversions, the conversion path data comprising paid keywords associated with bids submitted by the content provider and organic search keywords that are not associated with paid bid by the content provider;

determining, at the analysis system, a plurality of organic search keywords within the conversion path data by removing the paid keywords from the conversion path data;

analyzing, at the analysis system, the plurality of organic search keywords within the conversion path data to generate an assist-to-last ratio for each of the plurality of organic search keywords, the assist-to-last ratio comprising a measure of a first number of times the organic search keyword is an assisting keyword not associated with a last selection of a content item prior to one of the plurality of conversions versus a second number of times the organic search keyword is a last-click keyword associated with the last selection prior to one of the plurality of conversions;

determining, for each organic search keyword, a relative position within the conversion paths associated with the organic search keyword using the assist-to-last ratio for the organic search keyword;

selecting one of the plurality of organic search keywords based on the determined relative positions;

generating a content recommendation of types of new content to be generated or published by the content provider based on the selected organic search keyword, wherein the content recommendation includes developing content related to the subject matter of the selected organic keyword; and transmitting the content recommendation to the content provider.

2. The method of claim 1, the content recommendation comprising one or more recommendations for new portions for a website of the content provider.

3. The method of claim 1, further comprising analyzing, at the analysis system, the plurality of organic search keywords within the conversion path data to generate an analysis metric, wherein the analysis metric comprises a conversion contribution metric related to how directly the organic search keyword contributes to the plurality of conversions.

4. The system of claim 3, further comprising selecting one of the plurality of organic search keywords based at least in part on the analysis metric.

5. The method of claim 1, wherein selecting the one of the plurality of organic search keywords comprises, for each of the plurality of organic search keywords:

comparing the assist-to-last ratio for the organic search keyword to a threshold assist-to-last ratio; and determining whether to select the organic search keyword based on the comparison.

6. The method of claim 3, wherein the analysis metric further comprises a scale metric indicating a frequency with which the organic search keyword appears in the conversion path data.

7. The method of claim 3, wherein the analysis metric further comprises a new visitor metric related to how often within the conversion path data the organic search keyword is associated with driving new customers of the content provider to a resource of the content provider.

8. The method of claim 1, further comprising:

determining reaction data based on whether the content provider accepts or rejects the recommendation; and determining one or more subsequent recommendations based in part on the reaction data.

9. The method of claim 2, wherein the content provider publishes a new content item based on one of the one or more recommendations, and wherein the method further comprises:

determining new conversion path data subsequent to publication of the new content item, wherein the new conversion path data comprises one or more conversion paths including user traffic to the new content item; and generating an assessment of the contribution of the new content item to one or more conversions in the new conversion path data.

10. A system comprising:

at least one computing device operably coupled to at least one memory and configured to:

determine conversion path data for a content provider, wherein the conversion path data comprises data relating to a plurality of conversion paths associated with the content provider leading to a plurality of conversions, and wherein each of the plurality of conversion paths comprises one or more user actions leading to one of the plurality of conversions, the conversion path data comprising paid keywords associated with bids submitted by the content provider and organic search keywords that are not associated with paid bid by the content provider;

determine a plurality of organic search keywords within the conversion path data by removing the paid keywords from the conversion path data;

analyze the plurality of organic search keywords within the conversion path data to generate an assist-to-last ratio for each of the plurality of organic search keywords, the assist-to-last ratio comprising a measure of a first number of times the organic search keyword is an assisting keyword not associated with a last selection of a content item prior to one of the plurality of conversions versus a second number of times the organic search keyword is a last-click keyword associated with the last selection prior to one of the plurality of conversions;

determine, for each organic search keyword, a relative position within the conversion paths associated with the organic search keyword using the assist-to-last ratio for the organic search keyword;

select one of the plurality of organic search keywords based on the determined relative positions;

generate a content recommendation of types of new content to be generated or published by the content provider based on the selected organic search keyword, wherein the content recommendation includes developing content related to the subject matter of the selected organic keywords; and transmit the content recommendation to the content provider.

11. The system of claim 10, wherein the at least one computing device is configured to generate one or more recommendations for new portions for a website of the content provider.

12. The system of claim 10, wherein the at least one computing device is configured to analyze the plurality of organic search keywords within the conversion path data to generate an analysis metric, wherein the analysis metric comprises a conversion contribution metric related to how directly the organic search keyword contributes to the plurality of conversions.

13. The system of claim 12, wherein the at least one computing device is configured to select one of the plurality of organic search keywords based at least in part on the analysis metric.

14. The system of claim 10, wherein the at least one computing device is configured to select the one of the plurality of organic search keywords by, for each of the plurality of organic search keywords:
comparing the assist-to-last ratio for the organic search keyword to a threshold assist-to-last ratio; and
determining whether to select the organic search keyword based on the comparison.

15. The system of claim 12, wherein the analysis metric further comprises a scale metric indicating a frequency with which the organic search keyword appears in the conversion path data.

16. The system of claim 10, wherein the content provider publishes a new content item based on the recommendation, and wherein the at least one computing device is further configured to:
determine new conversion path data subsequent to publication of the new content item, wherein the new conversion path data comprises one or more conversion paths including user traffic to the new content item; and
generate an assessment of the contribution of the new content item to one or more conversions in the new conversion path data.

17. One or more non-transitory computer-readable storage media having instructions stored thereon that, when executed by at least one processor, cause the at least one processor to perform operations comprising:
determining conversion path data for a content provider, wherein the conversion path data comprises data relating to a plurality of conversion paths associated with the content provider leading to a plurality of conversions, and wherein each of the plurality of conversion paths comprises one or more user actions leading to one of the plurality of conversions, the conversion path data comprising paid keywords associated with bids submitted by the content provider and organic search keywords that are not associated with paid bid by the content provider;
determining a plurality of organic search keywords within the conversion path data by removing the paid keywords from the conversion path data;
analyzing the plurality of organic search keywords within the conversion path data to generate an analysis metric for each of the plurality of organic search keywords, the analysis metric comprising an assist-to-last ratio that comprises a measure of a first number of times the organic search keyword is an assisting keyword not associated with a last selection of a content item prior to one of the plurality of conversions versus a second number of times the organic search keyword is a last-click keyword associated with the last selection prior to one of the plurality of conversions;
determining, for each organic search keyword, a relative position within the conversion paths associated with the organic search keyword using the assist-to-last ratio for the organic search keyword;
selecting one of the plurality of organic search keywords based on the determined relative positions;
generating a content recommendation of types of new content to be generated or published by the content provider based on the selected organic search keyword, wherein the content recommendation includes developing content related to the subject matter of the selected organic keywords; and
transmitting the content recommendation to the content provider.

18. The one or more non-transitory computer-readable storage media of claim 17, wherein the conversion contribution metric comprises a conversion contribution metric related to how directly the organic search keyword contributes to the plurality of conversions.

19. The one or more non-transitory computer-readable storage media of claim 17, wherein selecting the one of the plurality of organic search keywords comprises, for each of the plurality of organic search keywords:
comparing the assist-to-last ratio for the organic search keyword to a threshold assist-to-last ratio; and
determining whether to select the organic search keyword based on the comparison.

20. The one or more non-transitory computer-readable storage media of claim 17, wherein the analysis metric further comprises at least one of a scale metric and a new visitor metric, wherein the scale metric indicates a frequency with which the organic search keyword appears in the conversion path data, and wherein the new visitor metric relates to how often within the conversion path data the organic search keyword is associated with driving new customers of the content provider to a resource of the content provider.

21. The method of claim 1, further comprising comparing each assist-to-last ratio with a predetermined threshold, the step of determining the relative position comprising determining, for each organic search keyword, a relative position in a conversion path based on the comparison.

22. The method of claim 1, wherein the step of determining the relative position comprises:
comparing, for each organic search keyword, the assist-to-last ratio associated with the organic search keyword with a first threshold and a second threshold;
in response to determining that the assist-to-last ratio is above the first threshold, determining that the organic keyword is at a first relative position indicating the organic keyword is most frequently an assisting keyword; and
in response to determining that the assist-to-last ratio is below the second threshold, determining that the organic keyword is at a second relative position indicating that the organic keyword is most frequently a last-click keyword.

23. The method of claim 22, wherein the first threshold and the second threshold are determined based on a goal received from the content provider.

24. The method of claim 1, further comprising selecting a predetermined number of organic search keywords having highest or lowest assist-to-last ratios from among the organic search keywords to generate the content recommendation.

* * * * *